(12) United States Patent
Ridett

(10) Patent No.: US 6,354,289 B1
(45) Date of Patent: Mar. 12, 2002

(54) AMBIENT HEAT COLLECTION PANELS

(75) Inventor: Alan Hilton Ridett, Isle of Wight (GB)

(73) Assignee: Envirotech Investments Limited (IE)

( * ) Notice: Subject to any disclaimer, the term of this patent is extended or adjusted under 35 U.S.C. 154(b) by 0 days.

(21) Appl. No.: 08/793,174

(22) PCT Filed: Aug. 31, 1995

(86) PCT No.: PCT/GB95/02056

§ 371 Date: Feb. 28, 1997

§ 102(e) Date: Feb. 28, 1997

(87) PCT Pub. No.: WO96/07061

PCT Pub. Date: Mar. 7, 1996

(30) Foreign Application Priority Data

Sep. 1, 1994 (GB) .............................. 9417542

(51) Int. Cl.$^7$ ................................. F24J 2/04
(52) U.S. Cl. ................. 126/622; 126/640; 126/663; 165/177; 52/533; 52/539
(58) Field of Search ................. 126/621, 622, 126/623, 663, 668, 669, 664, 906, 640; 165/177, 178, 144, 145, 49; D13/102; D25/140; 285/61; 52/173.3, 533, 539, 551, 588.1

(56) References Cited

U.S. PATENT DOCUMENTS

| | | | | | |
|---|---|---|---|---|---|
| 3,679,531 A | * | 7/1972 | Wienand et al. | ............. | 165/177 |
| 4,144,874 A | * | 3/1979 | Zebuhr | ............. | 126/623 |
| 4,237,859 A | * | 12/1980 | Geottl | ............. | 126/640 |
| 4,237,861 A | * | 12/1980 | Fayard | ............. | 126/622 |
| 4,258,703 A | * | 3/1981 | Reitmaier | ............. | 126/623 |
| 4,305,385 A | * | 12/1981 | Heuser | ............. | 126/621 |
| 4,426,999 A | * | 1/1984 | Evans et al. | ............. | 126/663 |
| 4,470,406 A | * | 9/1984 | Rinklake et al. | ............. | 126/622 |
| 4,607,616 A | * | 8/1986 | Lehmann | ............. | 126/669 |
| 4,636,577 A | * | 1/1987 | Peterpaul | ............. | 136/206 |
| 4,898,153 A | | 2/1990 | Sherwood | | |
| 5,476,141 A | * | 12/1995 | Tanaka | ............. | 165/173 |
| 6,035,928 A | * | 3/2000 | Ruppel et al. | ............. | 165/177 |

FOREIGN PATENT DOCUMENTS

| | | |
|---|---|---|
| DE | 25 23 976 | 12/1976 |
| DE | 26 14 145 | 10/1977 |
| DE | 30 44 371 | 6/1982 |
| DE | 39 09 663 | 9/1990 |
| EP | 0 109 374 | 5/1984 |
| EP | 0 382 456 | 8/1990 |
| FR | 611 964 | 6/1979 |

* cited by examiner

*Primary Examiner*—Sara Clarke
(74) *Attorney, Agent, or Firm*—Fay, Sharpe, Fagan, Minnich & McKee, LLP

(57) ABSTRACT

A building (1) has a roof structure (2) clad with a plurality of ambient heat collection tiles in the form of panels (3), mounted on parallel battens (4) carried by roof rafters (10), and disposed in edge-overlapping relationship. The panels (3) are of identical form. Each panel comprises a plank-like aluminum extrusion of substantial length and of rectangular plan form, having edge-coupling portions (5, 6). The interior of each panel (3) is formed with pair of substantially parallel ducts (7, 8) disposed side by side, which define flow and return paths respectively, for a heat transfer fluid, such as water. The flow and return ducts (7, 8) are divided from each other by an integral barrier wall (9). A panel (3) is not of uniform lateral cross section throughout its length. The cross section is uniform except at the ends where the dividing wall (9) has been cut away at one end so as to allow water to pass from the flow path (7) to the return path (8) in a re-entrant manner. The adjacent end of the panel (3) is closed-off by a blanking plug secured in place by welding or by adhesive.

19 Claims, 3 Drawing Sheets

AMBIENT HEAT COLLECTION PANELS

BACKGROUND OF THE INVENTION

This invention relates to ambient heat collection panels.

Such panels may be used as tiles and/or cladding on buildings in order to collect heat from the ambient atmosphere and, when available, from the direct rays of the sun.

SUMMARY OF THE INVENTION

According to the invention, an ambient heat collection panel is formed with internal ducts defining flow and return paths for heat transfer fluids.

The ducts are preferably disposed substantially parallel to each other, side by side.

The panel is preferably shaped for inter-engagement with further such panels in edge overlapping relationship.

The panel preferably comprises an extrusion.

The invention also comprises a building clad, at least in part, by a plurality of such panels.

BRIEF DESCRIPTION OF THE DRAWINGS

An Embodiment of the invention will now be described, by way of example only, with reference to the accompanying drawings, wherein.

DETAILED DESCRIPTION OF THE INVENTION

Figure 1:
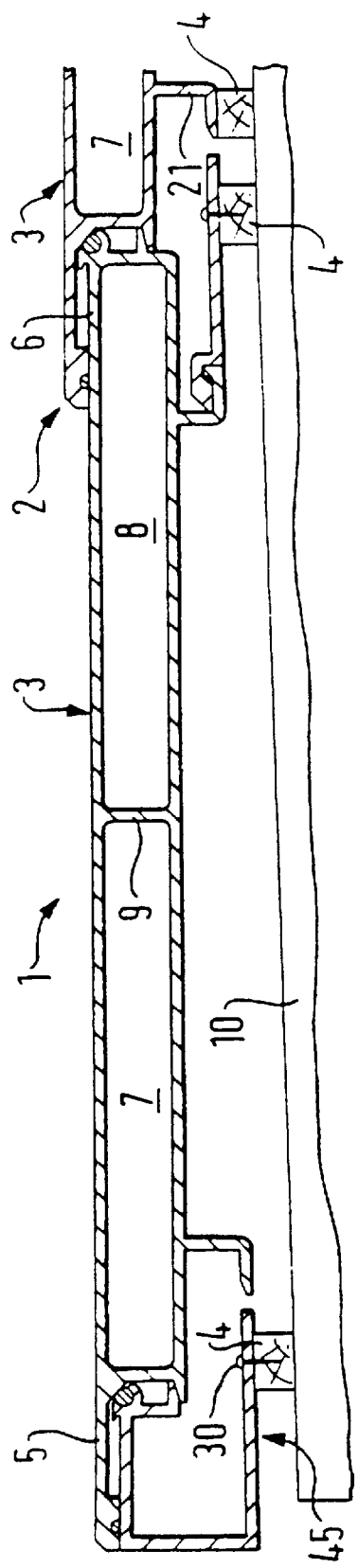
FIG. 1 is a fragmentary side view, in medial section, of the roof structure of a building and illustrates the embodiment.
Figure 2:
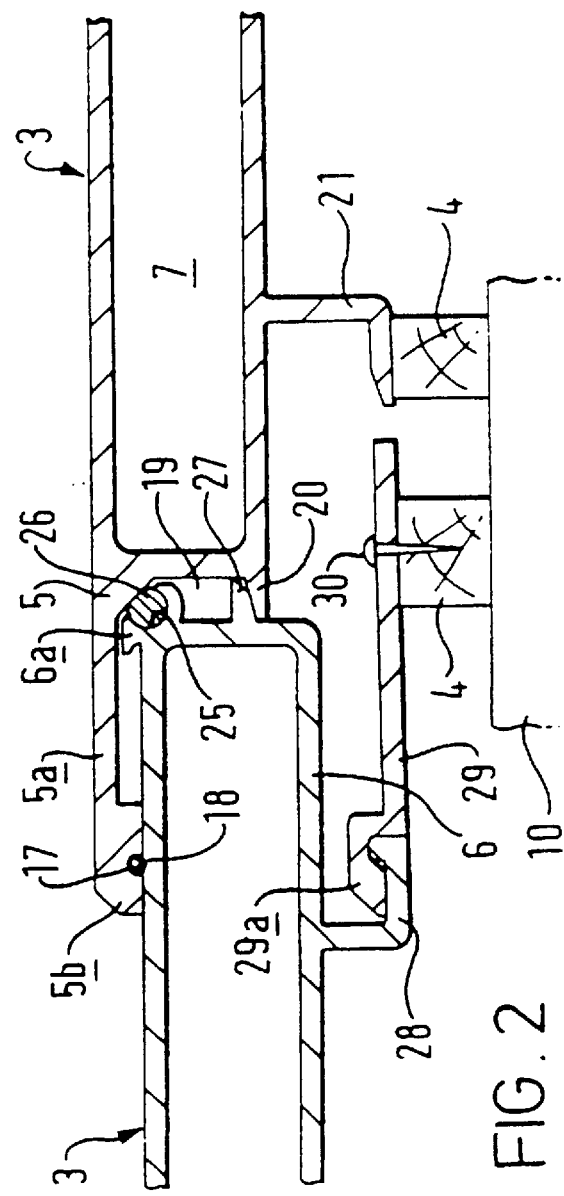
FIG. 2 is an enlarged view of part of the arrangement shown in FIG. 1.
Figure 3:
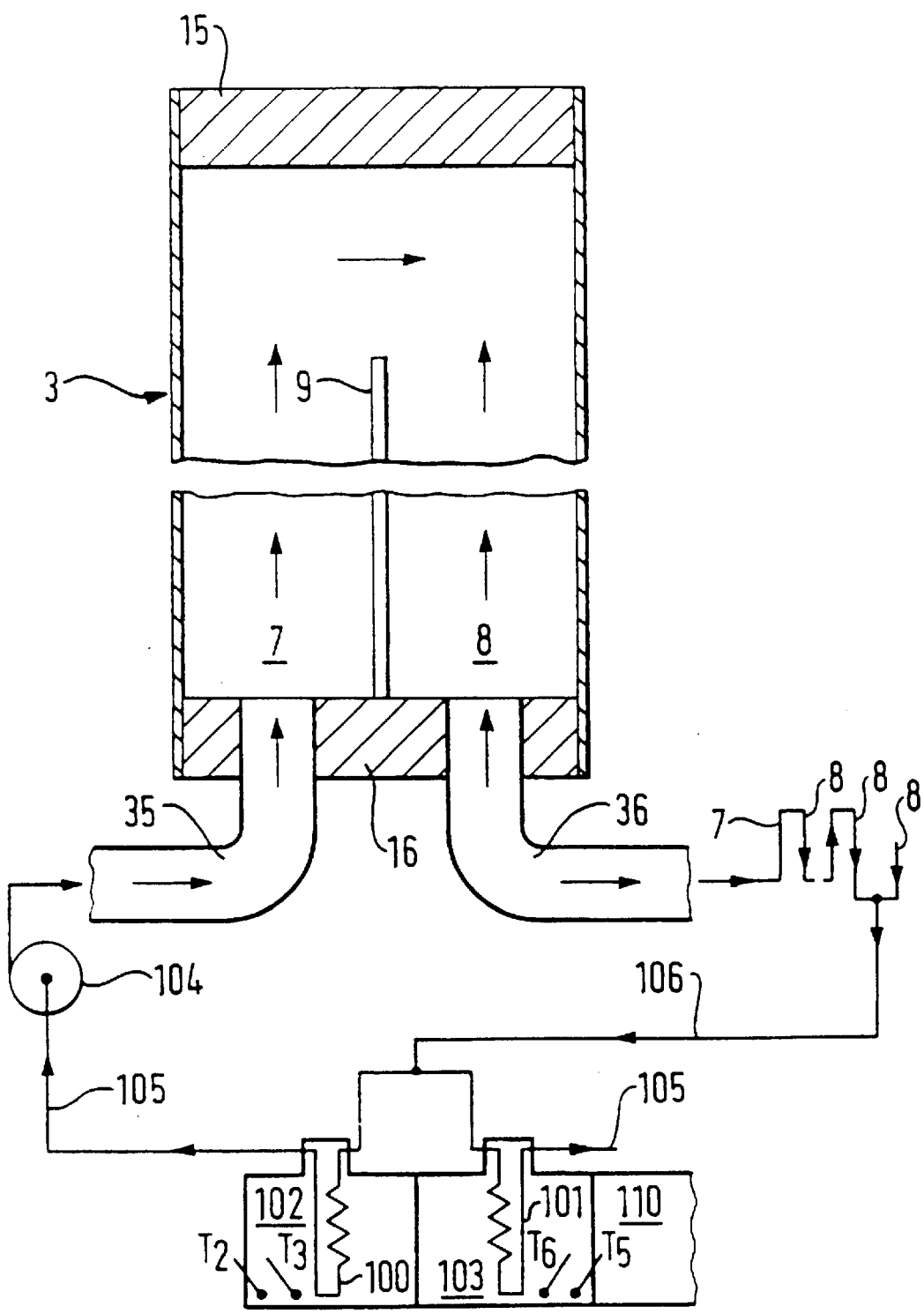
FIG. 3 is a semi-diagrammatic plan view, in medial section, of a panel, with added detail.

With reference to FIGS. 1 to 3, a building 1 comprising a house has a two-sided or pitched roof structure 2 clad with a plurality of ambient heat collection tiles in the form of panels 3, mounted on substantially parallel battens 4 carried by roof rafters 10. The panels 3 are disposed in edge-overlapping relationship.

The panels 3 are of identical form. Each panel comprises a plank-like aluminium extrusion of substantial length and of rectangular plan form, having edge-coupling portions 5, 6.

Each elongate panel 3 is formed with a pair of substantially parallel ducts 7, 8 disposed side by side. The ducts 7, 8 define flow and return paths respectively, for heat transfer fluid, which in this example is water. The water contains antifreeze and corrosion inhibitors.

The panels 3 are disposed in rows on the rafters 10, each panel extending longitudinally across its side of the roof structure 2.

The flow and return ducts 7, 8 are divided from each other by an integral barrier wall 9.

A panel 3 is not of uniform lateral cross-section throughout its length. The cross-section is uniform except at the ends where, see FIG. 3, the dividing wall 9 has been cut away at one end so as to allow water to flow from the flow path 7 to the return path 8 in a re-entrant, ie hairpin, manner. Cutting of the wall 9 may achieved by a milling operation.

The adjacent end of the panel 3 is closed-off by a blanking plug 15, secured in place by welding or by adhesive.

The opposite end of the panel 3 is closed-off by a blanking plug 16, which abuts the adjacent, cut-away end of the barrier wall 9. The plug 16 is also suitably secured in place.

The blanking plug 16 locates conduits 35, 36 which provide communication with the ducts 7, 8 respectively.

With reference to FIG. 2, the edge-coupling portion 5 is formed with an outwardly projecting lateral extension 5a terminating in an enlarged head 5b defining a longitudinal groove 17. The groove 17 may locate a flexible weather sealing strip 18.

The portion 5 is also formed with a longitudinal recess 19 having a bottom landing 20, as well as a longitudinally-extending foot 21 which rests on a batten 4 (FIG. 1).

The edge-coupling portion 6 is formed with an outwardly projecting extension 6a formed with a longitudinally-extending groove 25 which locates a flexible weather-sealing strip 26. The portion 6 is also formed with an outwardly-projecting ledge 27 which rests on the landing 20 of the adjacent panel. The contacting bottom surface of the ledge 27 and the upper surface of the landing 20 taper as shown.

The edge-coupling portion 6 is also formed with a longitudinally-extending projection 28 which is substantially L-shaped. This receives, at longitudinally-spaced intervals, panel fixing clips 29 having hook-like ends 29a which engage with the projection 28 as shown. The clips 29 are secured to the rafters 10 by way of battens 4 and nails 30.

The battens 4 may be replaced by a board extending between a foot 21 and clip 29.

As best shown by FIG. 1, the panels 3 of each side of the roof 2 rest on each other in overlapping relationship. An edge portion 6 of one panel 3 is received by the edge portion 5 of the adjacent panel 3, so that adjacent panels inter-engage at their edges.

With reference to FIG. 3, in use, the water is circulated through the internal ducts 7, 8 of the roof panels 3 on each side of the roof 2, using circulating pumps 104, (one for each roof side), disposed in lines 105. The lines 105 are connected to heat exchanger coils 100, 101 disposed in low 102 and medium 103 temperature heat stores.

On each side of the roof 2, water is pumped up the initial flow duct 7 of the first panel 3 in line, then down through the initial return duct 8 of that panel, to enter the flow duct 7 of the next panel in line. The flow through the roof panels 3 continues, first a duct 7, then a duct 8, from panel to panel, until it finally discharges from the duct 8 of the last panel 3 in line. Here the discharge is merged with the outward discharge from the last duct 8 of the last panel 3 in line on the other side of the roof 2.

The common discharge 106 flows back to the heat exchanger coils 100, 101 in the low and medium temperature heat stores, 102, 103.

There is also a high temperature heat store, namely 110.

A heat pump is used to transfer heat from the low temperature store 102 to the medium temperature store 103 and from the medium temperature store 103, to the high temperature store 110, in a controlled manner according to operating requirements for domestic use. The heat pump is used mainly during off-peak electricity tariff periods.

Thermostats $T_2$, $T_3$, $T_5$, $T_6$ are employed to transfer heat from store to store according to temperature differentials. For example, when roof water temperature is greater than that existing in the low temperature store 102, the thermostat $T_6$ causes pump 104 to run.

Thus heat from the ambient atmosphere is collected by the panels 3, in particular the upper surfaces 5 thereof, and is transferred to the water flowing through the internal ducts 7, 8. The heat is subsequently transferred to a heat sink and/or radiators disposed in the building 1.

FIG. 1 also illustrates use of an eave-finishing extrusion 45 which is short form of panel 3, having the equivalent of an end portion 6, but no equivalent of an end portion 5. The extrusion 45 is secured in place by a batten 4 (or board) and fixing nails 30.

The above-described embodiment has two internal ducts, namely flow and return ducts 7, 8. In a modification a panel has four internal ducts. Water is then caused to flow along a first duct, then back through a second duct, then in reverse flow through a third duct and finally in counter-flow along the fourth duct, all the ducts being adjacent. An increased number of plugs and conduits equivalent to plugs 15, 16 and conduits 35, 36 are required for this modification.

The size of a panel 3 can vary according to requirements.

A panel 3 of the example illustrated has a width of 235 to 250 mm and a length of 6 to 10 m. The ducts 7, 8 are 12 to 20 mm in height.

Should longer length panels be necessary, the panels 3 could be provided in pairs, each pair being interconnected end to end by a plug defining a water inlet and a water outlet, opposite ends of the plug fitting in the ducts 7, 8 of the two panels. The dividing walls 9 of the panels are cut back as before, in order to allow entry of the plug.

Where the panels 3 are interconnected, the joint may be covered by aluminium flashing, and a tray is disposed beneath the joint to collect and channel away any rain water that may enter.

Flashing may also be provided to protect gables and manifolds and ridge tiles used to extend across two sides of a sloping roof. Ridge tiles may be conventional or comprise panels according to the invention, of V-form when viewed in lateral cross-section. Ridge tiles according to the invention may incorporate make-up and expansion tanks. Such tanks may be of tubular form.

The panels may extend upwardly across a roof structure, rather than from side to side as shown in FIGS. 1 and 2. Thus the panels may extend from eave to ridge of a roof.

Figure 4:
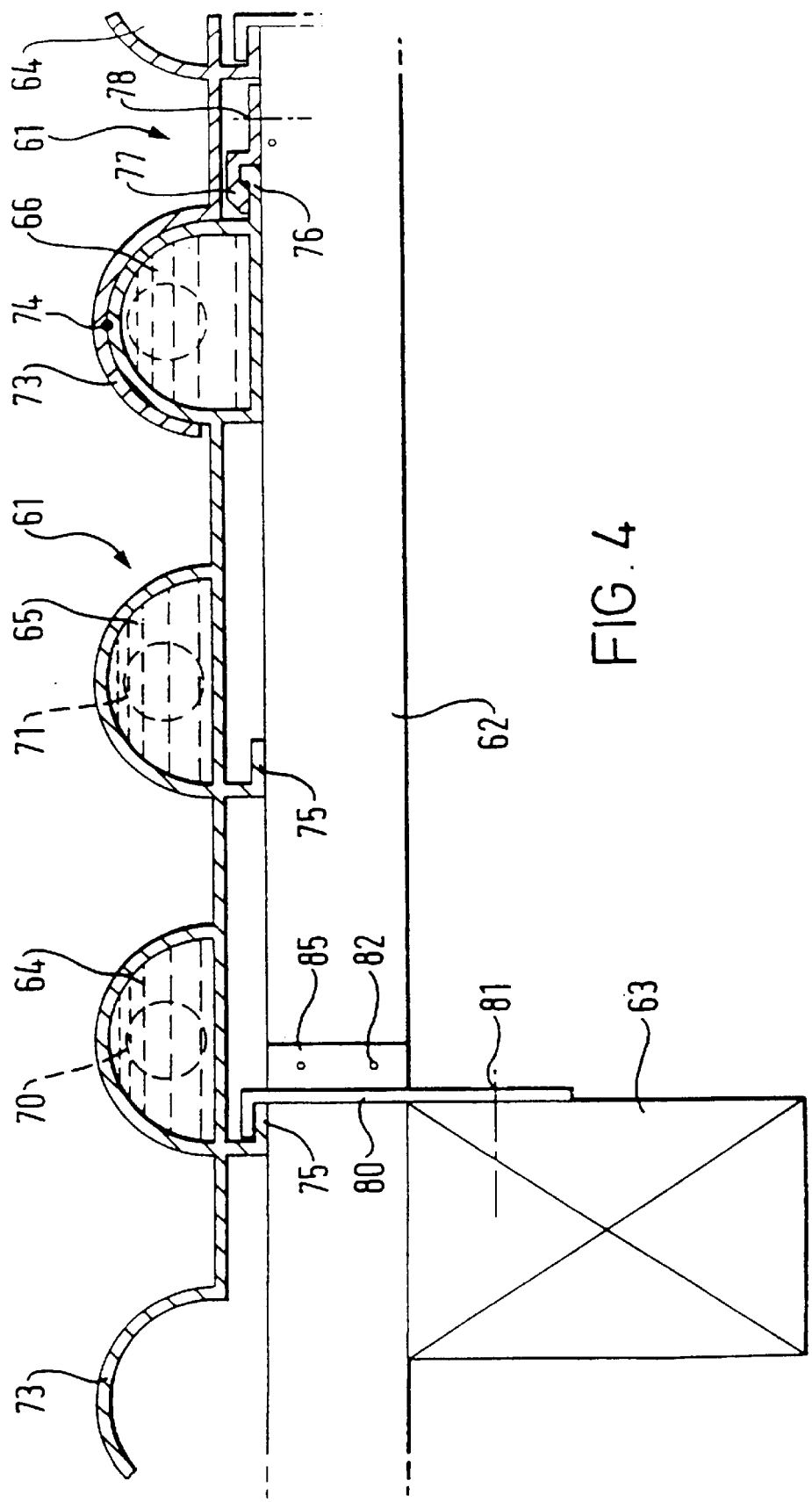
FIG. 4 is a fragmentary end view, in medial section, and illustrates another embodiment.

Panels according to the invention may assume different forms. FIG. 4 illustrates an array of substantially parallel eave to ridge ambient heat collecting panels 61 supported by rafters 63 and battens 62. Each panel 61 is of bold roll form and incorporates water flow ducts of part-circular form, namely ducts 64, 65, 66. Connecting manifold pipes 70, 71 communicating with heat pump 37 (FIG. 3) are disposed alternately at eaves and ridge so that the water flows from eave to ridge along duct 64, then in counter-flow from ridge to eave along duct 65, then in reverse flow along duct 66, followed by ridge to eave flow along the duct 64 of the adjacent panel 61.

A part-circular side edge 73 of one panel 61 overlaps the duct 66 of another as shown. A seal 74 may be disposed between the overlapping parts. A panel 61 has support legs 75 and an edge-disposed lug 76 which co-operates with a hook-like clip 77 secured to batten 62 at point 78. Another clip, namely clip 80, which is of inverted L-shaped form, with a side-projecting lug 85, engages a support leg 75 and is secured to the batten 62 and rafter 63 at points 81, 82.

A panel 61 is of extruded aluminium. It does not incorporate the equivalent of the barrier walls 9 (FIG. 3).

A building could be wholly clad by panels according to the invention.

What is claimed is:

1. An ambient heat collection panel formed from of a conductive material (1) and configured to collect low grade heat from the ambient atmosphere, said panel being formed with internal ducts (7, 8; 64, 65, 66) defining flow (7; 64) and return (8; 65) paths for heat transfer fluids, substantially an entire surface area of the heat transfer fluids being in thermal contact with the atmosphere and being separated from the atmosphere only by said conductive material forming the panel, said panel including a first edge coupling portion (6) for inter-engagement with additional panels, said edge coupling portion (6) defining a longitudinal groove (25) for locating a weather sealing strip (26) and a second edge coupling portion (5) including a longitudinal groove (17) for locating a second weather sealing strip (28).

2. A panel as claimed in claim 1, characterised in that the internal ducts are disposed substantially parallel to each other, side by side.

3. A panel as claimed in claim 1, characterised in that the panel is shaped (at 5, 6; 73) for inter-engagement with further such panels in edge overlapping relationship.

4. A panel as claimed in claim 1 characterised in that the internal ducts are divided from each other by a barrier wall (9).

5. A panel as claimed in claim 4, characterised in that the dividing wall is cut away at one end so as to allow heat transfer fluid to pass from the flow path to the return path in a re-entrant manner.

6. A panel as claimed in claim 5, characterised in that the end of the panel adjacent to the cut away end of the barrier wall is closed off by a blanking plug (15).

7. A panel as claimed in claim 6, characterised in that the end of the panel adjacent the non cut away end of the barrier wall is closed off by a blanking plug (16) locating conduits (35, 36) which provide fluid-flow communication with the internal ducts.

8. A panel as claimed in claim 1, comprising an extrusion.

9. A building clad, at least in part, by a plurality of panels as claimed in claim 1.

10. A building as claimed in claim 9, characterised in that the flow (7; 64) and return (8; 65) paths are connected to heat store means.

11. The heat collection panel of claim 1 adapted to function in conjunction with a heat pump.

12. The heat collection panel of claim 1, wherein the panel is fabricated from a metal material.

13. An ambient heat collection panel (1) configured to collect low grade heat from the ambient atmosphere, said panel being formed with internal ducts (7, 8; 64, 65, 66) defining flow (7; 64) and return (8; 65) paths for heat transfer fluids and including a first edge coupling portion (6) for inter-engagement with additional panels, said edge coupling portion (6) defining a longitudinal groove (25) for locating a weather sealing strip (26) and a second edge coupling portion (5) including a longitudinal groove (17) for locating a second weather sealing strip (28), said second edge coupling portion including an internal recess (19) having a bottom landing (20) and an outwardly projecting ledge (27) which, in use, is intended to rest on the bottom landing of an adjacent panel.

14. A panel as claimed in claim 13, characterised by a longitudinally-extending foot (21; 75) which, in use, is intended to rest on a panel support structure (4; 62).

15. A panel as claimed in claim 14, characterised by a substantially L-shaped projection (28; 75) which, in use, is intended to locate panel fixing clips (29; 80) having hook-like ends (29a) which engage with said projection.

16. An ambient heat collection panel (1) configured to collect low grade heat from the ambient atmosphere, said panel being shaped (at 5, 6, 73) for interengagement with further such panels in edge overlapping relationship, said panel being formed with internal ducts (7, 8; 64, 65, 66) defining flow (7; 64) and return (8; 65) paths for heat transfer fluids and including a first edge coupling portion (6) for inter-engagement with additional panels, said edge coupling portion (6) defining a longitudinal groove (25) for locating a weather sealing strip (26) and a second edge coupling portion (5) including a longitudinal groove (17) for locating a second weather sealing strip (28), said panel being of undulating form defining peaks and troughs, wherein the peaks define the said flow and return paths (7, 8, 64, 65, 66).

17. An ambient heat collection panel (1) configured to collect low grade heat from the ambient atmosphere by taking advantage of temperature differentials, said panel being formed with internal ducts (7, 8; 64, 65, 66) defining flow (7; 64) and return (8; 65) paths for heat transfer fluids and including a first edge coupling portion (6) for inter-engagement with additional panels, said edge coupling portion (6) defining a longitudinal groove (25) for locating a weather sealing strip (26) and a second edge coupling portion (5) including longitudinal groove (17) for locating a second weather sealing strip (28);

said panel being shaped (at 5, 6; 73) for inter-engagement with further such panels in edge overlapping relationship;

said panel being of undulating form defining peaks and troughs, wherein the peaks define the flow and return paths (64, 65); and said panel having a side edge which in use, is intended to overlap the peak of an adjacent such panel.

18. An ambient energy panel comprising:

at least one ambient heat collection panel of a highly conductive material and configured to collect low grade heat from the ambient atmosphere by taking advantage of temperature differentials;

internal ducts formed within the heat panel defining flow and return paths for heat transfer fluids, substantially an entire surface area of the heat transfer fluids being in thermal contact with the atmosphere and being separated from the atmosphere only by said conductive material forming the panel;

at least a first heat store and a second heat store, said first and second heat stores being of different temperatures; and a heat pump for transferring heat from the first heat store to the second heat store.

19. The ambient energy panel of claim 18, wherein the heat collection panel and the internal ducts formed therein operate to collect heat as a substantially unitary structure.

\* \* \* \* \*